United States Patent [19]

Boston et al.

[11] Patent Number: 4,864,000

[45] Date of Patent: Sep. 5, 1989

[54] THERMOSETTING COMPOSITIONS COMPRISING ACRYLIC POLYMERS WHICH ARE SUBSTANTIALLY FREE OF ACTIVE HYDROGENS

[75] Inventors: Russell E. Boston, Verona; David C. Kapp, Gibsonia, both of Pa.

[73] Assignee: PPG Industries, Inc., Pittsburgh, Pa.

[21] Appl. No.: 167,262

[22] Filed: Mar. 11, 1988

Related U.S. Application Data

[63] Continuation-in-part of Ser. No. 884,345, Jul. 11, 1986, abandoned.

[51] Int. Cl.$^4$ .............................................. C08L 61/00
[52] U.S. Cl. ................................. 525/143; 525/134; 525/162; 525/163; 525/502; 525/518; 427/388.1; 427/388.3
[58] Field of Search ................ 525/143, 162, 163, 134

[56] References Cited

U.S. PATENT DOCUMENTS 4,276,212  6/1981  Khanna et al. ...................... 525/162
4,490,417  12/1984  Shindow et al. ................. 427/388.3

Primary Examiner—Theodore E. Pertilla
Attorney, Agent, or Firm—Godfried R. Akorli

[57] ABSTRACT

Disclosed herein are thermosetting coating compositions comprising high Tg acrylic polymers which are substantially free of crosslinking groups, in combination with melamine resins in small but effective amounts to produce drawable cured coatings. These coating compositions are particularly useful in can coating where stringent fabricating properties and high film integrity are conjointly required.

8 Claims, No Drawings

THERMOSETTING COMPOSITIONS COMPRISING ACRYLIC POLYMERS WHICH ARE SUBSTANTIALLY FREE OF ACTIVE HYDROGENS

This is a continuation-in-part of application Ser. No. 884,345 filed on July 11, 1986, now abandoned.

BACKGROUND OF THE INVENTION

1. Field of the Invention

The present invention relates to thermosetting compositions containing acrylic copolymers. More specifically, the present invention relates to thermosetting compositions containing acrylic polymers which are substantially free of active hydrogens.

2. Brief Description of the Prior Art

Generally, coating compositions containing acrylic polymers and melamine curing agents are known in the art. In the art-known compositions, however, the acrylic polymers contain active hydrogen groups which interact with the melamines in order to effect crosslinking. To provide coating compositions that would cure effectively, that is, coatings that are hard and solvent resistant, predominant amounts of melamine resins are used in combination with acrylic polymers containing active hydrogen groups such as hydroxyl groups. While hard and solvent-resistant coatings are provided thereby, many of these coatings are found to be lacking in drawability.

In the area of can coating in particular, it is necessary to have coatings that are conjointly hard and drawable. This has become all the more necessary with the advent of cans having complex shapes. Coatings therefor must be such as would contour these shapes without loss of adhesion when the coated substrate is drawn. As would be realized, there is therefore a need for coating compositions containing acrylic polymers which will cure to provide coatings which are at the same time drawable and have good film integrity. The present invention provides such coatings.

SUMMARY OF THE INVENTION

The present invention in the preferred embodiment encompasses a coating composition comprising an acrylic polymer which is substantially free of functional crosslinking groups comprising active hydrogen groups, which are typically hydroxyl groups, and which has a Tg of about 45° C. or higher, preferably about 65° C. or higher, and more preferably about 100° C. or higher; and an aminoplast or phenoplast in small but effective amounts to provide cure. Articles of matter coated therewith, particularly cans useful as beverage or food containers, are also encompassed by the claimed invention.

By the term "substantially free of functional crosslinking groups" is meant the active hydrogen group which is typically a hydroxyl group is present in an amount less than about 10 percent by weight and preferably 5 percent by weight and more preferably less than 2 percent by weight based on the total weight of the acrylic polymer. By the term "small but effective amount" of aminoplast or phenoplast is meant that said resin is employed in amounts less than 25 percent and preferably less than 20 percent solids of the total weight of the coating composition.

Surprisingly, it has been found that even though the nonfunctional acrylic polymers are substantially free of active hydrogen-containing groups, and even though the melamine resins are used in relatively small amounts, coating compositions containing the same, upon heating, cure to produce coatings that are drawable and at the same time have good film integrity in that the coatings are hard and have good solvent resistance and other desirable film properties.

DETAILED DESCRIPTION OF THE INVENTION

The principal ingredients of the coating compositions of this invention are the acrylic polymers having a high Tg which are substantially free of crosslinkable active hydrogen groups which typically comprise hydroxy groups, and the aminoplasts or phenoplasts. The high Tg acrylic polymer can be prepared by free radical addition polymerization of ethylenically unsaturated monomers which are selected on the basis that (1) the resultant copolymer has a Tg of about 45° C. or higher, preferably about 65° C. or higher, and more preferably about 100° C. or higher and (2) that the resultant polymer is substantially free of crosslinking active hydrogen groups. A typical example of a high Tg copolymerizable monomer is methyl methacrylate. Other high Tg acrylic monomers can be acrylic or methacrylic acid esters of cyclic or polycyclic alcohols. Examples thereof can be isobornyl acrylate and isobornyl methacrylate, acrylic acid or methacrylic acid ester of a cyclic alcohol such as cyclohexanol; vinyl monomers such as styrene, vinyl toluene, and the like. In an illustrative embodiment of this invention, methyl methacrylate can be copolymerized with other monomers, the selection of which is based on specific property or properties that these other monomers impart to the resultant copolymer. The Tg referred to herein is the calculated glass transition temperature of the acrylic polymer.

In selecting the other copolymerizable monomers, it can be advantageous to employ those that at once impart high Tg as well as other desirable properties. Consonantly, methyl methacrylate can be employed with acrylic acid which is a high Tg monomer and which can at the same time provide water-solubilizing groups.

The acrylic polymer can be prepared by conventional free radical initiated solution polymerization techniques in which the acrylic monomers are dissolved in a solvent or mixture of solvents and polymerized in the presence of a free radical initiator until the desired molecular weight is obtained.

Examples of free radical initiators are those which are soluble in the polymerization medium such as azobisisobutyronitrile, azobis(alpha, gamma-dimethylvaleronitrile), tertiary-butyl perbenzoate, tertiary-butyl peracetate and benzoyl peroxide.

Optionally chain transfer agents such as alkyl mercaptans such as tertiary-dodecyl mercaptan; ketones such as methyl ethyl ketone, and chlorohydrocarbons such as chloroform can be used.

Usually, the solvent is first heated to reflux and the mixture of acrylic monomers containing the free radical initiator added slowly to the refluxing solvent. After addition, additional catalyst is optionally added and the reaction mixture held at polymerizing temperatures so as to reduce the free monomer content of the reaction mixture.

For water-based compositions, water-miscible solvents are used in the polymerization. Examples include the monoalkyl ethers of ethylene glycol which contain from 1 to 4 carbon atoms in the alkyl group such as ethylene glycol monoethyl ether and ethylene glycol monobutyl ether. Examples of other suitable water-miscible solvents are isopropanol and diacetone alcohol. Mixtures of solvents including mixtures of water-miscible solvents with water can also be used.

For water-based compositions, the acrylic polymer contains a solubilizing or dispersing group such as a carboxyl group which can be at least partially neutralized with a base. An example of the base can be an alkali metal hydroxide or preferably an organic amine. Suitable amines are water-soluble amines including primary, secondary and tertiary amines including hydroxylamines. Examples include ethanolamine, diethanolamine, N-methylethanolamine, dimethylethanolamine, methylamine, ethylamine, diethylamine, trimethylamine, triethylamine, morpholine and ammonia.

The base-neutralized acrylic polymer can be solubilized or dispersed in water. Alternate means of solubilizing or dispersing the acrylic polymer or otherwise making it compatible with water is intended to be encompassed by this invention.

The acrylic polymers of this invention are preferably of low molecular weight. The molecular weight is typically from about 5000 to 40,000 and preferably 8000 to 20,000. The molecular weight is based on polystyrene standards.

The aminoplasts useful herein are aldehyde condensation products of melamine, benzoguanamine, urea or similar compounds. Generally, the aldehyde employed is formaldehyde, although useful products can be made from other aldehydes such as acetaldehyde, crotonaldehyde, acrylene, benzaldehyde, furfuryl and others. Condensation products of melamine, urea or benzoguanamine are most common and are preferred, but products of other amines and amides in which at least one amino group is present can be employed. For example, such condensation products can be produced from various diazines, triazoles, guanidines, guanamines and alkyl and dialkyl-substituted derivatives of such compounds including alkyl and aryl-substituted ureas and alkyl and aryl-substituted melamines and benzoguanamines. Examples of such compounds are N,N-dimethylurea, N-phenylurea, dicyandiamide, formoguanamine, acetoguanamine, 6-methyl-2,4-diamino-1,3,5-triazine, and the like.

These amine-aldehyde and amide-aldehyde condensation products can contain methylol groups or similar alkylol groups depending upon the particular aldehyde employed. If desired, these methylol groups can be etherified by reaction with an alcohol. Various alcohols are employed for this purpose including essentially any monohydric alcohol, although the preferred alcohols contain from 1 to 4 carbon atoms such as methanol, ethanol, isopropanol and n-butanol.

In the practice of this invention as a coating composition, the acrylic polymer and the aminoplast or phenoplast resin can be employed in amounts sufficient to impart to the coating composition the conjoint properties of drawability and film integrity. Typically, resinous adjuncts such as polyester polyols, polyether polyols, alkyds and functional acrylic polymers are employed therewith. The resinous adjuncts are selected on the basis of cost and properties such as flow, viscosity and the like. It is of note that the resinous adjuncts may contain active hydrogen groups which may crosslink wit the aminoplast or phenoplast. Hence, the amounts in which the acrylic polymers and/or the aminoplasts or phenoplasts are employed generally depend on the types and amounts of the resinous adjuncts that are present. Generally, the acrylic polymer is employed in amounts of 15 to 75 percent by weight, and preferably 18 to 35 percent by weight based on total resin solids of the coating composition. The aminoplast or phenoplast is employed in amounts of about 25 percent or less and preferably 10 to 20 percent by weight based on the total resin solids of the composition.

Also contained in the coating composition can be additives such as flow control agents, adhesion promoters, cure catalysts and the like. The coating compositions of this invention can be prepared by blending the acrylic polymer, the aminoplast and other coating additives, and adjuncts thoroughly.

The coating composition can be applied directly to substrates such as aluminum, steel or the like by means such as roll-coating. Also, the coating compositions can be applied as clear coatings over pigmented base coats which can be in the form of ink patterns on can coatings. The coated substrates are cured by, say, baking to a temperature sufficient to effect such cure. Typically, the coated substrates are baked at peak metal temperatures of about 350° F. (177° C.) to 400° F. (204° C.).

The cured coatings are drawable and pasteurizable after they have been drawn. Drawability which is a measure of fabricating property is measured by the first stage screw-cap method which is as follows. Using a force of about 15 tons, flat nosed cups of about 2.7 centimeters diameter are deep drawn to about 0.9 centimeters rise on a Swift cupping press starting from various blanks of aluminum panels coated directly with the compositions of this invention or coated over inks. Good drawability is exhibited when there is no cracking and/or loss of adhesion of the coating on the side of the cap, upon visual inspection.

The cured coatings have good film integrity in that they have good pencil hardness, and good solvent resistance which can be evaluated by methyl ethyl ketone double-rubs with a cloth which has been wet with methyl ethyl ketone and used to rub across the surface of the cured coating until the integrity of the film is affected.

These and other aspects of the present invention are further illustrated by the following non-limiting examples.

EXAMPLE 1

This example illustrates the coating compositions of this invention.

| Ingredients* | Parts by Weight (grams) |
| --- | --- |
| RESIMINE 747[1] | 16 |
| Nonfunctional acrylic polymer[2] | 33 |
| Resinous adjuncts | 38 |

[1]Melamine resin, available from Monsanto Co.
[2]Derived from 88 percent methyl methacrylate and 12 percent methacrylic acid, having a Tg of 125° C. and molecular weight of 9100.
*In formulating the coating composition, the above ingredients were thoroughly blended and typical coating additives such as acid catalysts, flow control agents and the like were added where needed.

The above coating composition was applied to panels of aluminum substrate by roll-coating and baked at 400° F. (204° C.) for 90 seconds. The cured coatings were hard in that up to 50 methyl ethyl ketone double-rubs did not remove the film. The cured coating had very good fabricating property in that it exhibited good drawability.

EXAMPLE 2

This example also illustrates the coating compositions of this invention and methods of preparing and using the same.

The coating composition was formulated in essentially the same manner as described in Example 1, except that there was employed an additional acrylic polymer which was hydroxy-functional.

| Ingredients | Percent Composition |
|---|---|
| RESIMINE 747 | 16 |
| Nonfunctional acrylic polymer[1] | 29 |
| Hydroxy-functional acrylic polymer[2] | 4 |
| Resinous adjuncts | 48 |

[1]Same as in Example 1.
[2]Derived from 39% butyl acrylate/11% acrylic acid/27% methyl methacrylate/5% styrene/5% butyl methacrylate/5% hydroxyethyl acrylate and having a Tg of 36° C. and molecular weight of 18,000 to 20,000.

The coating was roll-coated, cured and evaluated as described in Example 1, with the following results. The cured coating was hard in that up to 25 methyl ethyl ketone double-rubs did not affect film integrity.

EXAMPLE 3

This example further illustrates the coating compositions of this invention and methods of preparing and using the same in comparison with coating compositions containing hydroxy-functional acrylic polymers.

| | Parts by Weight (grams) | |
|---|---|---|
| Ingredients | Test Composition | Comparative Composition |
| Resinous polyols | 20 | 20 |
| RESIMINE 747 | 15 | 15 |
| Hydroxy-functional acrylic polymer[1] | — | 226.8 |
| Hydroxy-free acrylic polymer[2] | 226.8 | — |
| Dimethylethanolamine | 1.0 | 1.0 |
| Deionized water | 47.9 | 47.9 |

[1]Derived from 73% methyl methacrylate/12% methacrylic acid/10% hydroxyethyl acrylate/5% styrene.
[2]83% methyl methacrylate/12% methacrylic acid/5% styrene.

The coating compositions were prepared and applied in essentially the same manner as described in Example 1. Coated panels were baked at 400° F. (204° C.) for 90 seconds. The cured coating was evaluated with the following results:

| | Test | Control |
|---|---|---|
| Pencil Hardness | 5H | 5H |
| Methyl ethyl ketone double rubs | 50+ | 50+ |
| Fabrication Properties on: | | |
| Bare aluminum | 1 | 1-2 |
| Red ink | 1-2 | 3-4 |
| White ink | 1-2 | 3-4 |

On a scale of 1 to 10 with 1 being rated best and 10 worst, the above showed the coating compositions of this invention are well suited to coating bare aluminum panels and inked panels to provide highly desired fabricability.

EXAMPLE 4

This example illustrates the lower Tg limits of the acrylic polymers useful in the coating compositions of this invention.

| Ingredients | Percent by Weight (grams) | Solids |
|---|---|---|
| Acrylic polymer[1] | 226.8 | 63.5 |
| RESIMINE 747 | 20.0 | 20.0 |
| Adhesion promoter | 1.3 | 0.8 |

[1]The acrylic polymer useful herein was derived from 15.1 percent acrylic acid; 4.9 percent hydroxyethyl acrylate, 30 percent methylmethacrylate, 20 percent ethylhexyl acrylate, and 30 percent styrene and had a Tg of 46.4° C.

A coating composition comprising a blend of the above ingredients was applied to a substrate, cured, and evaluated in essentially the same manner as described in Example 3. The results were as follows: Pencil hardness was greater than 4H, methyl ethyl ketone double rubs were greater than 100, and fabrication property on clear aluminum was about 2 on a scale of 1 to 10, with 1 being the best and 10 being the worst.

EXAMPLE 5 (Comparative)

This example shows an acrylic polymer having a high Tg and a relatively high hydroxy content of about 20 percent. A coating composition containing the above acrylic polymer was prepared, applied, and evaluated in essentially the same manner as described in Example 4.

| Ingredients | Percent by Weight (grams) | Solids |
|---|---|---|
| Acrylic polymer[1] | 226.8 | 63.5 |
| RESIMINE 747 | 20.0 | 20.0 |
| Adhesion | 1.3 | 0.8 |

[1]The acrylic polymer was derived from 9.9 percent acrylic acid; 49.6 percent styrene, 20.7 percent hydroxyethyl methacrylate, and 19.86 percent isodecyl methacrylate, having Tg of 52.1° C.

Pencil hardness was greater than 4H and methyl ethyl ketone double-rubs were greater than 100. However, with the relatively higher hydroxy content, the coating had relatively less fabrication property which was between 7 and 8, on a scale of 1 to 10, with 1 being the best and 10 being the worst.

What is claimed is:
1. A coating composition comprising:
   (i) an acrylic polymer having a Tg of about 45° C. or higher, contains less than 10 percent by weight hydroxyl groups based on the total weight of the acrylic polymer, and
   (ii) an aminoplast or phenoplast in a small but effective amount to provide a cure of the coating composition.
2. A coating composition of claim 1, wherein the acrylic polymer has a Tg of about 65° C. or higher.
3. A coating composition of claim 1, wherein the Tg is about 100° C. or higher.
4. A coating composition of claim 1, wherein the acrylic polymer contains less than about 5 percent by weight hydroxyl group.
5. A coating composition of claim 1, wherein the aminoplast or phenoplast is present in an amount of about 10 to 20 percent by weight based on the total resin solids of the coating composition.
6. A coating composition of claim 1, wherein the acrylic polymer contains carboxyl groups.
7. A coating composition of claim 6, wherein the carboxyl groups are present in an amount of about 5 to 15 percent by weight.
8. A coating composition of claim 1, wherein the acrylic polymer is of low molecular weight up to about 10,000.

* * * * *